Patented Aug. 23, 1938

2,128,126

UNITED STATES PATENT OFFICE 2,128,126

POLYMERIZATION OF GASEOUS OLEFINES

Albert Ernest Dunstan, London, England, assignor to Anglo-Iranian Oil Company, Limited, London, England No Drawing. Application June 5, 1936, Serial No. 83,697. In Great Britain June 26, 1935

16 Claims. (Cl. 196—10)

This invention relates to the polymerization of gaseous olefines especially for the production of a liquid product suitable for use as a motor spirit or as a blending material for such fuel by reason of its high Octane value and its still higher anti-knock value when used as a blending material.

The invention has among its objects to use for the purpose a catalyst whose high polymerizing efficiency is maintained without liability to liquefy or to disintegrate while in use, and which after use for a long period is capable of being regenerated, whereby its original efficiency is restored. Such a catalyst is adapted for effective use in the polymerization of gaseous olefines and especially propylene and the butylenes which in its use may be rapidly polymerized for the production of a spirit boiling within the gasoline range.

According to the invention a catalyst is employed for polymerizing gaseous olefines, consisting of or containing cadmium dihydrogen ortho-phosphate, the gaseous olefines to be polymerized being passed through or over the catalyst under conditions in which the catalyst is maintained in the substantially dry state in which it was produced and the treatment carried out at temperatures within a range that may not substantially exceed 250° C. and at a pressure advantageously though not necessarily higher than atmospheric pressure.

According to the invention moreover a salt of cadmium and ortho-phosphoric acid is employed as catalyst that may be produced by combining cadmium ortho-phosphate with ortho-phosphoric acid in the ratio of 1 molecular proportion of cadmium ortho-phosphate to from 2 to 4 molecular proportions of ortho-phosphoric acid, the cadmium ortho-phosphate being in a finely divided condition intimately mixed with ortho-phosphoric acid and the mixture dried and heated to a moderate temperature not substantially in excess of 100° C., whereby a solid cake is produced that is dry, porous, hard and resistant to disintegration under the conditions of use, the cake being broken into fragments or grains without further treatment before use in the polymerization of normally gaseous olefines.

The catalyst is thus produced without roasting or calcining and without addition to the mixture of absorbent or dehydrating substances. The catalyst consists of or contains cadmium dihydrogen ortho-phosphate in proportion corresponding to the molecular proportion of ortho-phosphoric acid to cadmium ortho-phosphate used in its preparation. It is known that cadmium dihydrogen ortho-phosphate is converted into the solid compound:

$$Cd_3(PO_4)_2 \cdot 2CdHPO_4 \cdot 4H_2O$$

when heated to 100° C. with excess of water, free phosphoric acid being also produced in solution. It is however also known that the reaction by which this compound is produced from cadmium dihydrogen ortho-phosphate is reversible, for if the compound be evaporated in contact with free phosphoric acid as is the case in the production of the dried cake in the manner hereinbefore described, the two re-combine and produce the cadmium dihydrogen ortho-phosphate. This compound consisting of or containing cadmium dihydrogen ortho-phosphate under the conditions of its use as a catalyst in the polymerization of olefines is maintained in substantially the same dry state. The reversible reaction is expressed as follows:

$$5Cd(H_2PO_4)_2 + 4H_2O \rightleftarrows Cd_3(PO_4)_2 \cdot 2CdHPO_4 \cdot 4H_2O + 6H_3PO_4$$

it being understood that the reaction proceeds from left to right when the compound is heated to 100° C. with excess of water, and in the reverse direction from right to left when water is removed from the system by drying.

In the production of such a catalyst in the form of fragments or grains from the dried cake the upper limit in molecular proportion of ortho-phosphoric acid to cadmium ortho-phosphate may with advantage be 3.5. The product may however be increased in hardness and resistance to disintegration by pulverizing the cake and mixing with it a binder, the mass being consolidated or pelleted, and then roasted for the production of especially hard pellets not liable to disintegrate under the conditions of use.

For the purpose the dry cake produced may be pulverized and mixed with from 2½ to 5% by weight of lubricating oil acid tar and/or 5% of graphite, and the mass pelleted and the pellets finally roasted for from 12 to 24 hours at about 300° C. The period of heating is determined at the stage when the pellets are rendered dry and sufficiently hard to be very resistant to disintegration in use.

According to the invention moreover copper ortho-phosphate in a finely divided condition may be mixed with cadmium ortho-phosphate also in a finely divided condition and ortho-phosphoric acid, and the mixture heated and dried in the manner hereinbefore described for the production of a hard, dry and porous cake that is resistant to disintegration, the copper salt being advantageously used in equi-molecular proportion with the cadmium salt. The molecular ratios of cadmium ortho-phosphate, copper ortho-phosphate and ortho-phosphoric acid may be within the limits of 1:1:3 and 1:1:8. The product in the form of a dry, hard and porous cake may be broken into fragments or grains and used in that condition, or it may be pulverized and mixed with a binder and/or graphite and then consolidated or pelleted and finally roasted in the manner hereinbefore described for the production of an especially hard and resistant catalyst containing cadmium copper dihydrogen ortho-phosphate.

In carrying out the polymerizing treatment the crude gas if its condition require it, may be treated for desulphurizing and for removing from the gas any gum or other constituents that would contaminate the catalyst used, the gas being for the purpose treated for its cleansing and purification in known manner as its condition and character may require.

The catalyst may be charged into towers or casings in bulk or in trays in the form of pellets or as broken cake or grains and the gas passed through the charge at a temperature within a range for example of 180°–250° C. and at atmospheric pressure or preferably at a pressure higher than atmospheric such for example as 100 to 500 lbs. per sq. inch. The size of the pellets, broken cake or grains and the thickness of the catalyst bed are such that there shall be good contact between gases and catalyst without excessive resistance at the high velocity of the gas flow. The broken cake or grains on their being charged may be passed through a screen for the removal of fines.

One, two or more such towers or casings may be used through which the gas containing the gaseous olefines to be polymerized may be passed in series, the gas being first heated to the determined temperature within the range indicated, by passage through heat exchangers or otherwise, and on passing from the first tower or casing may be re-heated or cooled, to be raised or lowered to the determined temperature before passage through the remaining towers or casings. For this purpose the towers or casings may be constructed in known manner and with known means for the control of the gas stream and for cutting out the towers or casings in succession for the purpose of the regeneration of the charge.

Means may also be provided for re-cycling the gas as may be required to ensure a substantially complete conversion. This re-cycling may also serve as means for the control of the temperature of the catalyst in the towers or casings, since the reaction is exothermic.

It is found that the activity of the catalyst may be maintained for substantially longer periods if the gas containing the olefines to be polymerized is first mixed with a small proportion of steam. The proportion of steam used may be from 4 to 10% by volume and not substantially more. It is known to use a small proportion of steam in processes of conversion of gaseous olefines and no novelty is claimed broadly in this condition of polymerization.

When the activity of the catalyst has fallen to such an extent as to render its further use uneconomical, it may be regenerated to its original activity by heating in a current of nitrogen or flue gas at about 300° C. for a period of time usually from 4 to 24 hours depending on the length of time the catalyst has been previously used. It has been found that the catalyst may be repeatedly regenerated with no fall from its original activity.

The following examples illustrate the conditions of use of two catalysts and the nature and quantity of the motor spirit distilled from the liquid produced. In the examples catalyst A was produced from material pelleted in the manner hereinbefore described from a dry pulverized cake being the product of heating and drying of a mixture of cadmium orthophosphate and orthophosphoric acid in the molecular proportion of 1:3, while catalyst B was a catalyst in the form of grains produced by heating a finely divided mixture of cadmium ortho-phosphate, copper ortho-phosphate and ortho-phosphoric acid in the molecular ratio of 1:1:4.

*Example*

|  | Catalyst A | Catalyst B |
|---|---|---|
| Pressure lbs./sq. inch | 150 | 150 |
| Temperature °C | 230 | 230 |
| Inlet gas rate cu. ft. at standard temperature and pressure per lb. of catalyst per hour | 4.0 | 4.0 |
| Percent vol. steam in inlet gas | 7.0 | 7.0 |
| Weight of product/weight of catalyst | 32.5 | 95 |
| Composition of gas treated: 80% total olefines, 45% $C_4H_8$, 35% $C_3H_6$ |  |  |
| Properties of gasoline distilled from the liquid produced: |  |  |
| Sp. gr. at 60° F | 0.77 | 0.77 |
| Octane No. (CFR motor method) | 80 | 81 |
| Percent vol. at 100° C | 15 | 14 |
| Percent vol. at 140° C | 57 | 60 |
| F. B. P., °C | 200 | 200 |

I claim:

1. A process for polymerizing normally gaseous olefines such as propylene and the butylenes for the production of a motor spirit, in which cadmium dihydrogen ortho-phosphate is used as the catalyst, in which process the catalyst is maintained in a substantially dry state.

2. A process for polymerizing normally gaseous olefines such as propylene and the butylenes for the production of a motor spirit, in which cadmium dihydrogen ortho-phosphate is used as the catalyst and is maintained in a substantially dry state and the gas to be treated is mixed with a proportion of from 4 to 10% by volume of steam.

3. A process for polymerizing normally gaseous olefines such as propylene and the butylenes for the production of a motor spirit, in which cadmium dihydrogen ortho-phosphate is used as catalyst being first prepared by intimately mixing cadmium ortho-phosphate and ortho-phosphoric acid in the ratio of one molecular proportion of cadmium ortho-phosphate to between 2 and 4 molecular proportions of ortho-phosphoric acid, heating and drying the mixed mass at a temperature not substantially in excess of 100° C. for the production of a dry, hard and porous material resistant to disintegration under the conditions of its use in the process as a catalyst.

4. A process for polymerizing normally gaseous olefines such as propylene and the butylenes for the production of a motor spirit, in which cadmium dihydrogen ortho-phosphate is used as catalyst being first prepared by intimately mixing cadmium ortho-phosphate and ortho-phosphoric acid in the ratio of one molecular proportion of cadmium ortho-phosphate to between 2 and 4 molecular proportions of ortho-phosphoric acid, heating and drying the mixed mass at a temperature not substantially in excess of 100° C. for the production of a dry, hard and porous material, reducing the dry, hard and porous material to a finely divided state, mixing the finely divided material with a binder and then consolidating the mixture and roasting the consolidated products.

5. A process for polymerizing normally gaseous olefines such as propylene and the butylenes for the production of a motor spirit in which cadmium dihydrogen ortho-phosphate is used as catalyst being first prepared by intimately mixing cadmium ortho-phosphate and ortho-phosphoric acid in the ratio of one molecular proportion of cadmium ortho-phosphate to between 2 and 4 molecular proportions of ortho-phosphoric acid, heating and drying the mixed mass at a temperature not substantially in excess of 100° C. for the production of a dry, hard and porous material, reducing the dry, hard and porous material to a finely divided state, mixing the finely divided material with 2½ to 5% by weight of lubricating oil acid tar, then consolidating the mixture and roasting the consolidated products.

6. A process for polymerizing normally gaseous olefines such as propylene and the butylenes for the production of a motor spirit in which cadmium dihydrogen ortho-phosphate is used as catalyst being first prepared by intimately mixing cadmium ortho-phosphate and ortho-phosphoric acid in the ratio of one molecular proportion of cadmium ortho-phosphate to between 2 and 4 molecular proportions of ortho-phosphoric acid, heating and drying the mixed mass at a temperature not substantially in excess of 100° C. for the production of a dry, hard and porous material, reducing the dry, hard and porous material to a finely divided state, mixing the finely divided material with 2½ to 5% by weight of lubricating oil acid tar and about 5% of graphite, then consolidating the mixture and roasting the consolidated products.

7. A process for polymerizing normally gaseous olefines such as propylene and the butylenes for the production of a motor spirit in which cadmium dihydrogen ortho-phosphate is used as catalyst being first prepared by intimately mixing cadmium ortho-phosphate and ortho-phosphoric acid in the ratio of one molecular proportion of cadmium ortho-phosphate to between 2 and 4 molecular proportions of ortho-phosphoric acid, heating and drying the mixed mass at a temperature not substantially in excess of 100° C. for the production of a dry, hard and porous material, reducing the dry, hard and porous material to a finely divided state, then mixing the finely divided material with graphite, then consolidating the mixture and roasting the consolidated products.

8. A process for polymerizing normally gaseous olefines such as propylene and the butylenes for the production of a motor spirit, in which the catalyst used is prepared by intimately mixing ortho-phosphoric acid with cadmium ortho-phosphate and copper ortho-phosphate, and heating and drying the mixed mass at a temperature not substantially in excess of 100° C. for the production of a dry, hard and porous material resistant to disintegration under the conditions of its use as a catalyst.

9. A process for polymerizing normally gaseous olefines such as propylene and the butylenes for the production of a motor spirit, in which the catalyst used is prepared by intimately mixing ortho-phosphoric acid with cadmium ortho-phosphate and copper ortho-phosphate, the molecular proportions being within the limits of 3:1:1 and 8:1:1, heating and drying the mixed mass at a temperature not substantially in excess of 100° C. for the production of a dry, hard and porous material resistant to disintegration under the conditions of its use as a catalyst.

10. A process for polymerizing normally gaseous olefines such as propylene and the butylenes for the production of a motor spirit in which the catalyst used is prepared by intimately mixing ortho-phosphoric acid with cadmium ortho-phosphate and copper ortho-phosphate, then heating and drying the mixed mass at a temperature not substantially in excess of 100° C. for the production of a dry, hard and porous material, reducing the dry, hard and porous material to a finely divided state, mixing the finely divided material with a binder, then consolidating the mixture and roasting the consolidated products.

11. A process for polymerizing normally gaseous olefines such as propylene and the butylenes for the production of a motor spirit in which the gas consisting of gaseous olefines is passed in contact with a catalyst consisting of cadmium dihydrogen ortho-phosphate as catalyst prepared in a dry, hard and porous state, recovering the liquid product of polymerization and distilling it for the recovery of a motor spirit.

12. A process for polymerizing normally gaseous olefines such as propylene and the butylenes for the production of a motor spirit in which the gas consisting of gaseous olefines is passed in contact with a catalyst consisting of cadmium copper dihydrogen ortho-phosphate as catalyst prepared in a dry, hard and porous state, recovering the liquid product of polymerization and distilling it for the recovery of a motor spirit.

13. A catalyst for use in the polymerization of olefines being cadmium dihydrogen ortho-phosphate in a dray, hard, porous and finely divided state, incorporated with a binder, consolidated and roasted.

14. A catalyst for use in the polymerization of olefines being cadmium dihydrogen ortho-phosphate in a dry, hard, porous and finely divided state incorporated with graphite, and roasted.

15. A catalyst for use in the polymerization of olefines being cadmium copper dihydrogen ortho-phosphate in a dry, hard, porous and finely divided state incorporated with a binder, consolidated and roasted.

16. A catalyst for use in the polymerization of olefines being cadmium copper dihydrogen ortho-phosphate in which the metals are present in equal proportion, the salt being in a dry, hard, porous and finely divided state, incorporated with a binder, consolidated and roasted.

ALBERT ERNEST DUNSTAN.